United States Patent [19]
Jones et al.

[11] 3,901,653
[45] Aug. 26, 1975

[54] LIQUID SAMPLING DEVICE

[75] Inventors: Robert H. Jones, Fullerton; Charles V. Hummel, La Habra, both of Calif.

[73] Assignee: Beckman Instruments, Inc., Fullerton, Calif.

[22] Filed: July 19, 1973

[21] Appl. No.: 380,908

[52] U.S. Cl. ............... 23/230 R; 23/259; 73/422 R; 141/1
[51] Int. Cl.² ...................... F04F 1/00; G01N 1/10
[58] Field of Search ............... 23/259, 253 R, 230 R; 137/209, 253, 123, 142, 145, 150.5; 141/1, 8, 67; 73/422 R

[56] References Cited
UNITED STATES PATENTS

| | | | |
|---|---|---|---|
| 2,102,282 | 12/1937 | Roy | 23/253 R |
| 3,085,717 | 4/1963 | Anscherlik | 23/253 R UX |
| 3,182,865 | 5/1965 | Anscherlik | 23/253 R UX |
| 3,186,808 | 6/1965 | Anscherlik | 23/259 X |
| 3,259,462 | 7/1966 | Anscherlik | 23/259 X |
| 3,284,164 | 11/1966 | Hach | 23/253 R |
| 3,419,358 | 12/1968 | Smythe et al. | 23/253 R X |
| 3,718,438 | 2/1973 | Anscherlik | 23/259 |

FOREIGN PATENTS OR APPLICATIONS

| | | | |
|---|---|---|---|
| 848,125 | 9/1960 | United Kingdom | 23/259 |

Primary Examiner—Joseph Scovronek
Attorney, Agent, or Firm—R. J. Steinmeyer; P. R. Harder

[57] ABSTRACT

A device for dispensing a predetermined quantity of a liquid sample has an S-shaped dosing tube with an inlet connected through a collecting vessel to an air supply for receiving air during vacuum, vent and pressure portions of an operation cycle and an outlet connected to deliver the sample to a recipient system. A supply tube connected to receive liquid from a source such as a process stream provides liquid to the dosing tube, during the vacuum portion of the cycle, through a transfer vessel operatively connected between the inlet and outlet. Liquid enters the transfer vessel from the supply tube at a level above that of liquid remaining in the dosing tube from a previous operation cycle. A drain tube is connected through the collecting vessel to the dosing tube to remove liquid in excess of the predetermined quantity prior to dispensing the sample. A liquid seal is provided in the tubes to prevent air escape and maintain pressure in the tubes. The device is especially adaptable to deliver a fresh sample for each operation cycle which is not mixed with liquid remaining in the device from a previous sample. Each cycle of operation is controlled by a programmer which provides signals to the air supply and the supply tube during vacuum, vent and pressure portions of each operation cycle.

23 Claims, 8 Drawing Figures

LIQUID SAMPLING DEVICE

BACKGROUND OF THE INVENTION

1. Field of the Invention.

This invention relates to liquid sampling devices and more particularly to apparatus and method for providing measured quantities of liquid to be analyzed.

2. Description of the Prior Art.

Sampling devices for automatically measuring and discharging measured liquid samples for use in analyzing the liquid properties have particular use in chemical water treatment and other similar industries. In the measurement and treatment for water pollution, for example, measured samples from a steam are delivered to an analyzer by a dispensing device or dosing apparatus where physical properties such as impurities are automatically analyzed.

In known dispensing devices of this type the forces of gravity and air pressure are utilized with apparatus which includes a Siphon tube adapted to receive a quantity of liquid from a storage source. Air pressure is periodically applied to the tube to discharge quantities of liquid determined by the size of vessels in the tube and pressure applied thereto. The pressure of the air forces within the tube cause the liquid to be expelled from it while the siphon created subsequently refills the tube from the storage source.

These conventional devices are inaccurate due to the use of complicated structure along with mechanical moving parts such as pumps, metering valves and the like, and inefficient and unreliable due to the complicated design of the system which tends to produce air bubbles and contamination. Furthermore the accuracy of the dosing operation is usually dependent upon maintaining precise regulation of the level of the liquid in the Siphon tube and for this reason the conventional devices must employ complex apparatus such as mariotte bottles, float valves, etc, to insure precision. The performance of such apparatus deteriorates by wear and similar factors which make the device of limited reliability and totally unacceptable for use in remote locations.

Various attempts have been made to solve the above noted problems by utilizing siphon or air pressure operated siphon shaped dosing devices along with curved tubes connected to provide pressure and vacuum seals to prevent undesirable bubbles from forming therin. These devices have been too complicated to achieve efficiency and reliability and wholly unable to obtain precision and accuracy.

In an attempt to obviate the drawbacks referred to above it has been proposed to employ a siphon tube system operted by gravity and air pressure which includes vacuum and pressure seals to prevent air bubbles from entering the stream. Such a system is shown, for example, in the apparatus taught in U.S. Pat. No. 3,718,438 to Anscherlik for DOSING APPARATUS wherein a dosing apparatus is provided which combines an S-shaped dosing tube formed to provide liquid seals with a supply tube responsive to liquid in a storage vessel to discharge measured quantities of liquid during pressure, vent and vacuum cycles for each operation. While the Anscherlik device operates efficiently and reliably and minimizes such problems as air bubble, it is only useful in reagent dosing operation since liquid from a previous sample is mixed with liquid in a subsequent sample. Thus there is always contamination between the samples making the device totally unacceptable for liquid sampling in which it is desired to obtain samples that are entirely separate from each other.

Accordingly there is a need for an accurate and reliable liquid sampling device which is able to operate in remote locations and which provides an accurate and efficient device for delivering measured quantities of a liquid sample to an analyzer without mixing the samples while still maintaining simplicity and reliability of operation.

SUMMARY

In brief, apparatus and method for dispensing liquid samples in accordance with the present invention is provided in which a predetermined quantity of liquid sample is delivered to a recipient system having a dosing tube for dispensing the liquid sample, a supply tube for delivering the liquid to the dosing tube from a source, and a drain tube for draining excess liquid from the dosing tube. Liquid remaining in the dosing tube after each operation cycle is prevented from mixing with liquid from subsequent cycles thereby providing samples substantially free from contamination.

In one preferred embodiment, the dosing tube has an inlet orifice, a lower bight, a dosing vessel operatively connected between the inlet orifice and one side of the lower bight, a discharge orifice, and a transfer vessel operatively connected between the discharge orifice and the other side of the lower bight. A collecting vessel is connected to the inlet orifice at a level below the level of the discharge orifice and above the top of the transfer vessel.

The liquid supply tube is responsive to a source of liquid which includes a liquid pump connected to the supply tube to continuously provide a constant flow of liquid through the supply tube from a source such as a water stream.

The supply tube is vertically oriented with respect to the dosing tube. The level of the liquid in the supply tube is maintained constant at a level above the top of the transfer vessel at all times to insure gravity flow of liquid to the transfer vessel during the vacuum operation. The composition of the liquid is thereby held equal to that of a process stream or other source of liquid which it is desired to analyze.

A feed conduit having a solenoid operated valve therein is connected between the supply tube and the transfer vessel to selectively pass liquid from the supply tube to the transfer vessel. The valve is responsive to a programmer to pass liquid to the transfer vessel during the vacuum portion of the cycle in such manner to avoid mixing with liquid from a previous cycle.

A drain tube has an inlet orifice operatively connected to the collecting vessel and an outlet orifice connected to discharge liquid from the collecting vessel to atmosphere at a level below the level of the dosing tube inlet orifice and above the dosing vessel. The drain tube discharges liquid in excess of the desired predetermined amount as determined by the dimensions of the vessels in the dosing tube.

Each of the dosing, supply and drain tubes are formed to maintain a liquid seal against predetermined pressure or vacuum in the system produced by the air pump and controlled by overpressure and underpressure level control units even if the supply of liquid from the supply tube falls below the predetermined amount.

As a special feature of the invention, the sampling device separates the liquid from consecutive cycles to avoid contamination between the samples. This is accomplished by supplying the liquid sample to the dosing tube through the transfer vessel at a level which ensures that the liquid supplied at the beginning of each cycle enters the dosing tube above the liquid remaining in the dosing tube from a previous cycle of operation. Dispensing devices of the prior art have been unable to avoid contamination between samples.

Liquid from a previous sample is discharged to a drain through the drain tube which has an inlet connected to the bottom of the collecting vessel. During the vacuum portion of a sampling cycle liquid enters the collecting vessel at a level slightly higher than the bottom of the collecting vessel with excess liquid draining through the drain tube. Liquid from a previous sample is thereby substantially flushed out during each cycle of operation. During subsequent cycles of operation, the liquid sample is further refined to realize a substantially pure sample.

According to another embodiment of the invention a liquid sample may be taken from a sample vial or a series of sample vials on a rotating sampling table. Liquid is transferred from each sample vial by means of a curved siphon tube having an upper bight connected to the liquid in the vital and a lower bight connected through a solenoid operated valve to the transfer vessel. In this manner, samples of liquid discretely stored in a plurality of containers may be sampled.

According to another aspect of the invention, the dispensing device may be operated as a sampling device to provide samples of liquid based on a volume of flow of liquid in a steam. Means are provided to provide a control signal at a given volume of flow. The signal actuates the sampling device to provide a sample of liquid based on a predetermined volume of flow liquid in the stream.

According to still another feature of the invention, a discrete sample of liquid may be sampled from liquid in a stream based upon a unit of time. For example, the total volume of flow is used to provide a discrete sample based upon flow per unit of time.

The invention may be utilized with one or more dosing tubes. In one embodiment, a plurality of dosing tubes are arranged in serial fashion to be fed a completed sample of liquid mixed with a sample from another doser. In this manner an aliquot of a previous sample of mixture of one or more samples may be taken.

BRIEF DESCRIPTION OF THE DRAWINGS

In order tht the invention may be more fully understood, a preferred embodiment in accordance therewith will now be described by way of example with reference to the accompanying drawings in which like reference numerals designate like parts throughout the figures thereof and wherein.

DESCRIPTION OF A PREFERRED EMBODIMENT

Figure 1:
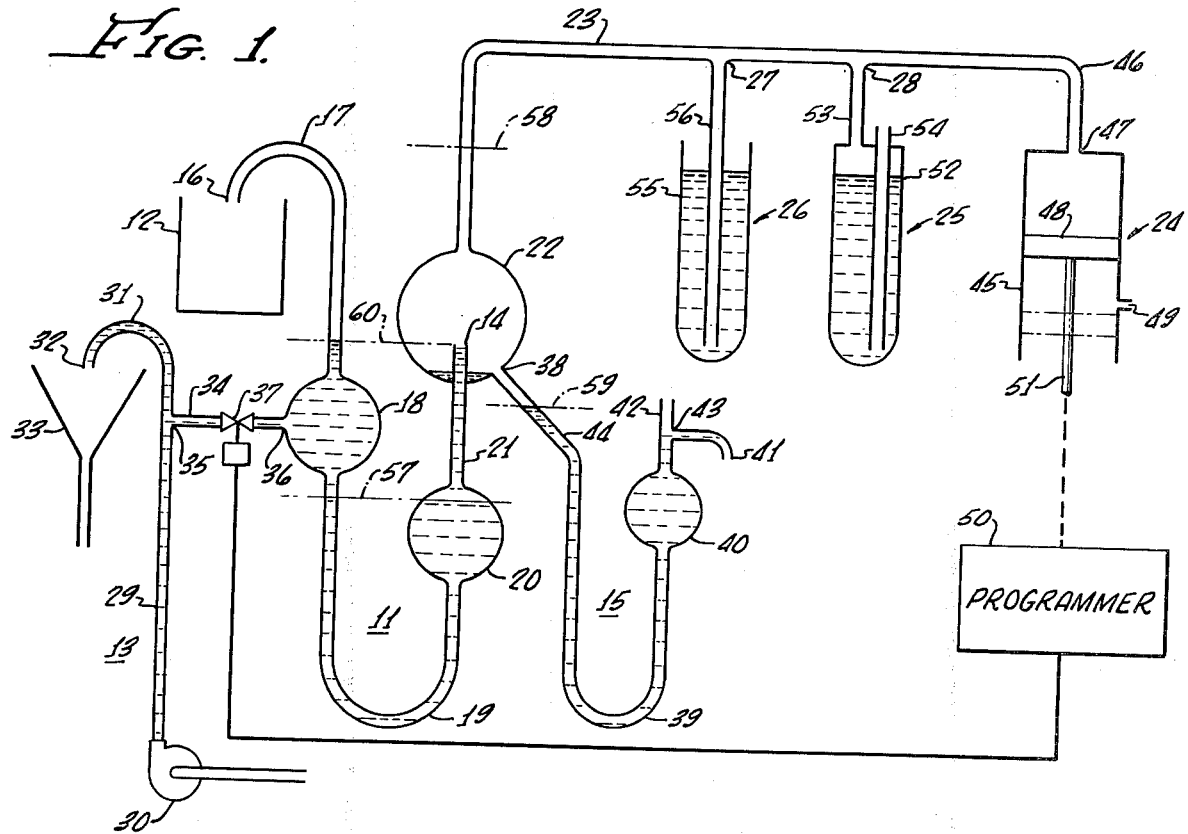
FIG. 1 is a schematic diagram of a dispensing device according to a preferred embodiment of the invention, with the level of liquid shown in the device for the vent portion of a cycle of operation.

As illustrated in the schematic diagram of FIG. 1, a dosing tube indicated generally at 11 is connected to dispensing a sample of liquid to a receiving vessel 12 of a recipient system during each cycle of operation. The dosing tube 11 is generally S-shaped vertically elongated tube having an inlet orifice 14 and discharge orifice 16 open to the atmosphere and adapted to feed a sample of liquid into the receivng vessel 12 for a cycle of operation. The dosing tube 11 includes an upper bight 17 connected to the discharge orifice 16, a lower bight 19, and a transfer vessel 18 operatively connected between the lower bight 19 and the upper bight 17. A dosing vessel 20 is operatively connected between the inlet orifice 14 and the lower bight 19 by a conduit 21. A collecting vessel 22 receives the inlet orifice 14 at the end of the conduit 21 at its lower end and is connected to a pressure conduit 23 which leads to the air supply means of the device. An air pump 24 is connected through conduit 23 to selectively provide air under vacuum, atmosphere and pressure to the dosing tube 11 during a cycle of operation. A vacuum regulator unit 25 and a pressure regulator unit 26 are respectively connected to branches 28 and 27 of the conduit 23 and function to control vacuum and pressure in the system.

A liquid supply tube, indicated generally at 13, has a vertically extending straight portion 39 having an inlet connected to receive a continuous supply of liquid from a source of liquid (not shown) such as a water stream through a pump 30. The pump 30 is connected in a preferred embodiment to receive water from a flowing stream or other source of liquid to be sampled and provides a continuous flow of water through the straight portion 29 of the tube 13 to thereby maintain the level of liquid in the supply tube 13 at the level of the upper bight 31 at all times during the flow of water through the pump 30.

The upper end of the portion 29 is connected through the upper bight 31 to a discharge orifice 32 which drains into a funnel 33.

Liquid is supplied to the dosing tube 11 from the supply tube 13 by a feed conduit 34 which has one end connected to a branch 35 of the straight portion 29 and the other end connected to an opening 36 in the transfer vessel 18. A solenoid operated valve 37 is connectd in the line of the feed conduit 34 to alternately pass and block the flow of liquid from the supply tube 13 to the dosing tube 11 according to designated portions of each cycle of operation.

A drain or discharge tube, indicated generally at 15 has an inlet 38 connected to an opening in the bottom of the collecting vessel 22 and a discharge orifice 41 extending from a branch 43 of a vertically extending portion 42 which is opened to atmosphere. The drain tube 15 includes an elongated portion 44, somewhat crooked or inclined with respect to a vertical portion, connected to a lower bight 39 which in turn extends upward through a reservoir vessel 40 which is connected through the extended portion 42 to atmosphere.

The air supply for providing air during the vacuum, vent and pressure portions of each cycle includes the air pump 24, the vacuum regulator unit 25 and the pressure regulator unit 26 all connected in parallel through pressure conduit 23 to the collecting vessel 22. The air pump 24 functions to provide vacuum, atmosphere, and pressure through pressure conduit 23 to the upper end of the collecting vessel 22. The pump 24 has a closed cylinder 45 to which a branch 46 from the conduit 23 is connected. Opposed to the inlet 47 of the cylinder 45 is located a movable piston head 48. A vent 49 is located a predetermined distance below the inlet 47 and opens the cylinder 45 to atmosphere when the piston head 48 is below the vent 49. Attached to the piston head 48 is a suitable actuating mechanism 51 which is operatively connected through suitable motive means to be controlled by a programmer 50. The air pump 24 along with its motive means and control apparatus is shown in schematic form only since the actual structure depends upon individual choice of design which would be readily apparent to one skilled in the art.

The piston 48 is actuated by the programmer 50 to move upwardly toward inlet 47 to create a pressure in the conduit 23, to move downwardly away from inlet 47 to create a vacuum in the conduit 23, and to create an opening to atmosphere for the conduit 23 when moved downwardly past the vent opening 49. In this manner, the vacuum, vent, and pressure portions of each cycle of operation are controlled.

The vacuum regulator unit 25 comprises a closed vessel 52 which is filled with liquid. The vessel 52 is connected by a tube 53 to the conduit 23 via branch 28. Extending into the vessel 52 is a second tube 54 which is open at one end to atmosphere, while its lower end is submerged to a predetermined depth in the liquid. The magnitude of the vacuum permitted in the system is regulated by the depth of the tube 54, its depth being proportionate to the magnitude. Assuming that the pump 24 is operated to provide a vacuum in the conduit 23 then the pressure inside the vessel 52 is lower than atmospheric pressure forcing the liquid down the tube 54. When the vacuum level reaches the predetermined height air passes from tube 54 and bubbles up through the liquid in vessel 52 thereby regulating the vacuum. The tube 54 is preferably long enough to prevent flow of liquid upwardly through it, in the event of an excess pressure in the system.

The pressure regulator unit 26 includes a vessel 55 open to atmosphere and adapted to be filled with a predetermined level of a liquid. A tube 56 extends from the branch 27 of conduit 23 into liquid contained in vessel 55. The magnitude of the pressure in the system is regulated by the length of the tube 56 immersed in the liquid of vessel 55 and is proportionate to the actual level of submersion. Now assume that air pressure is produced by the pump 24. When pressure is sufficiently high to displace the liquid from tube 56, air bubbles through the liquid thus controlling the pressure in conduit 23.

The pressure and vacuum regulator units may be provided with suitable means for adjusting the vacuum and pressure limits. For example, by raising or lowering the tubes 54 and 56 relative to its associated vessel, the pressure and vacuum limits may be varied. The design of mechanisms for accomplishing this are well within the skill of the art.

Programmer 50 provides control signals to the air pump 24 to create vacuum, atmosphere and pressure in conduit 23 as well as signals to valve 37 to open and close the valve. The programmer 50 is selectively designed to provide the proper timing of operation of the device according to selected design parameters which depend upon the timing desired between various portions of a cycle of operation.

Before describing in detail the operation of the device of FIG. 1 it is believed that some discussion of the overall relations between the various portions of the device including the vessels, conduits, and operating levels of liquid in the device will be of assistance in the understanding of the invention.

The amount of liquid to be discharged each cycle into the recipient vessel is determined by the volume of the dosing vessel 20. The volume of the transfer vessel 18 is larger than the volume of the dosing vessel 20. The upper end of the collecting vessel 22 should be located beneath the upper bight 17 of the dosing tube 11.

The curvature of the dosing tube 11 and the distance between the lower bight 19 and the upper bight 17 should be sufficient to insure that the liquid in the dosing tube 11 maintains a liquid seal against the pressure or vacuum produced in the system by the air pump and regulated by the pressure regulator 26 and vacuum regulator 25. This prevents compressed air inside the dosing device from bubbling through the dosing tube 11 from its lower bight 19 into the discharge orifice 16. A liquid seal is also provided in the drain tube 15 by providing a sufficient distance between the lower bight 39 and the discharge orifice 41. Additionally, the reservoir vessel 40 helps to prevent air bubbles during the vacuum portion of the operation cycle.

The discharge orifice 41 should be beneath the lower end of the collecting vessel 22 to insure operation of the tube 15 during the vacuum and vent portions of a cycle of operation.

The distance between the level of the bottom of the transfer vessel 18 and the level of the lower bight 19 should be sufficient so that the liquid in the dosing tube 11 maintains a liquid seal against the force of predetermined vacuum produced by the air pump 24.

The liquid pump 30 must provide a sufficient volume of flow of liquid through the straight portion 29 to maintain a constant head of liquid at the level of the upper bight 31 at all times during a cycle of operation.

DESCRIPTION OF OPERATION

Figure 2:
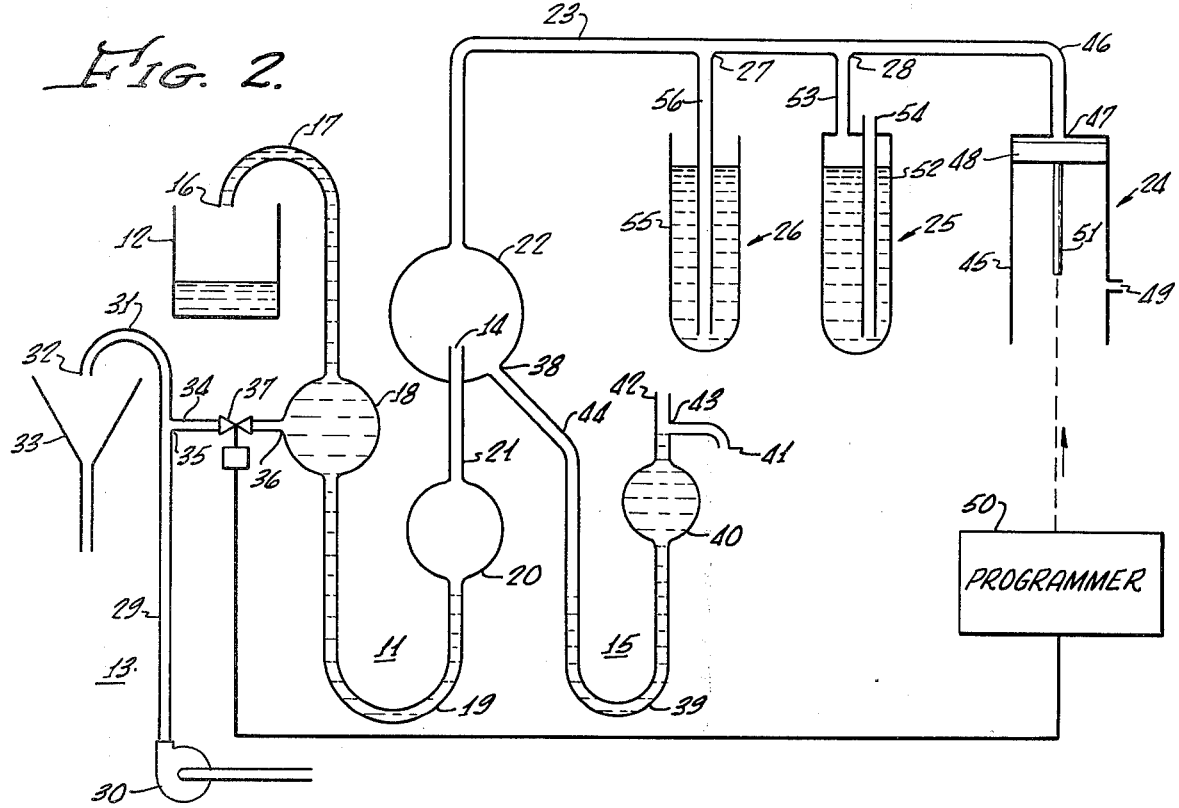
FIG. 2 is a schematic diagram of the device of FIG. 1, in which the level of liquid is shown for the pressure portion of a cycle.
Figure 3:
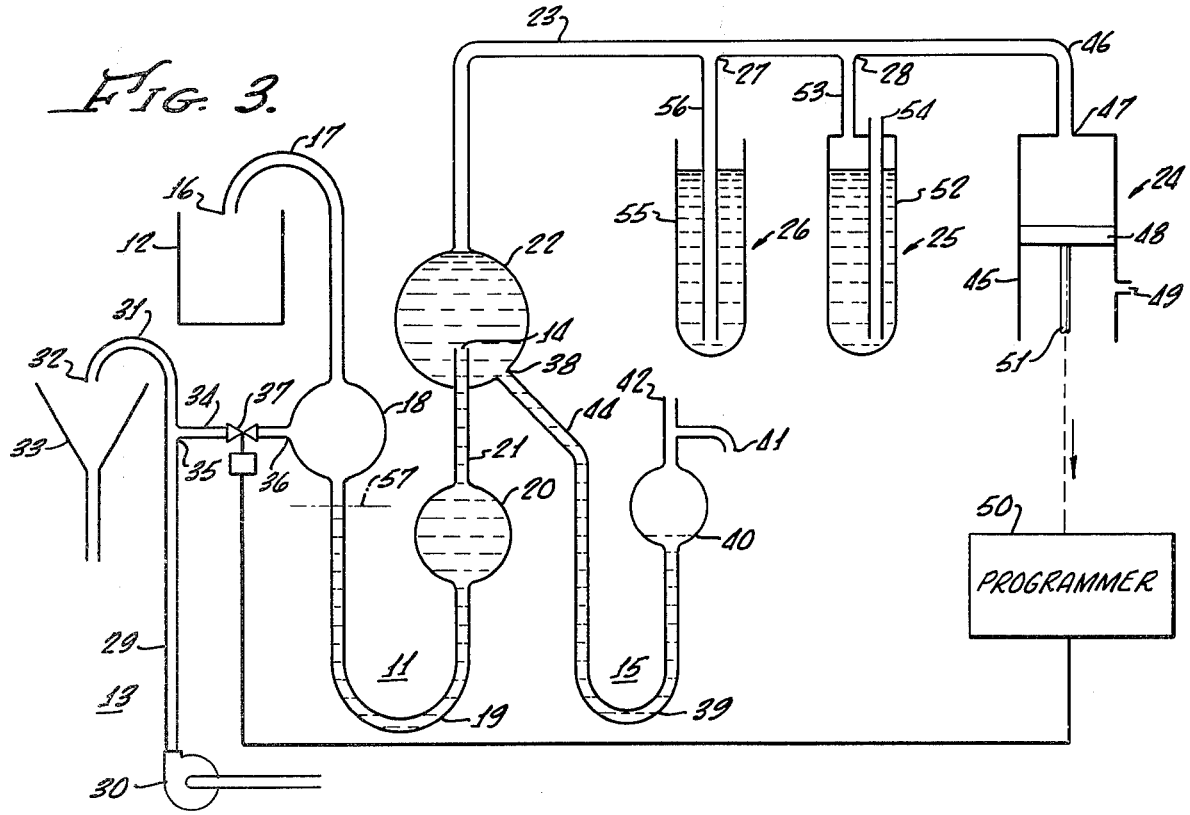
FIG. 3 is a schematic diagram of the device of FIG. 1, with the level of liquid shown for the initial part of the vacuum portion of a cycle.
Figures 4, 8:
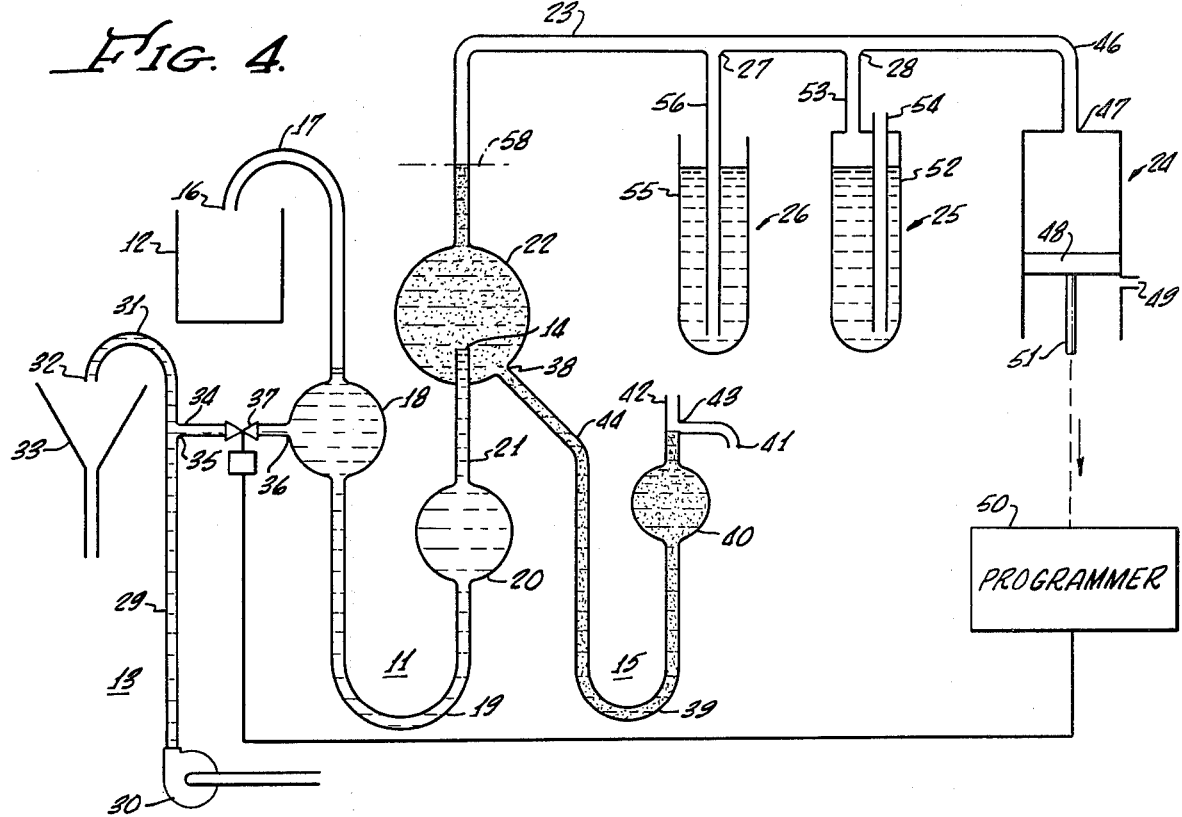
FIG. 4 is a schematic diagram of the device of FIG. 1, with the level of liquid shown for the full part of the vacuum portion of a cycle.
FIG. 8 illustrates a plurality of dispensing devices of the device of FIG. 1 in which serial dilutions of samples may be provided.

The device of FIG. 1 shows the level of liquid during the vent portion of a cycle of operation. In FIG. 2 the level of liquid just after the pressure portion is shown. FIG. 3 illustrates the liquid level for the initial part of the vacuum portion, and FIG. 4 illustrates the liquid level for the main part of the vacuum portion of a cycle.

In the description of the operation that follows it will be assumed that a cycle of operation is comprised of vacuum, vent and pressure portions in order to provide a succinct and accurate explanation of a complete cycle of operation.

In operation of the device of the invention as illustrated in FIGS. 1 to 4 a liquid sample is delivered to the receiving vessel 12 during a complete sampling cycle consisting of vacuum, vent and pressure portions. Initially the pump 30 is connected to provide a continuous flow of liquid from a source through the supply tube 13 maintaining a constant head at the level of bight 31. The programmer 50 provides the necessary signals to the air pump 24 to selectively provide air under vacuum, vent and pressure portions of a cycle and to open and close the valve 37.

Assuming now that the system is in operation and a cycle of operation begins with the vacuum portion. The liquid remaining in the dosing tube 11 from a previous cycle is approximately at the level just below the dosing vessel 20 (as particularly seen in FIG. 2) with some of the liquid from a previous cycle remaining in the tube 11 whereby the tube is completely full from bight 17 to level 57. Valve 37 is closed (by programmer 50 from the previous cycle) and piston 48 is above the vent opening 49 near the inlet 47 also from the previous cycle.

The programmer 50 now provides a signal to cause piston 48 to move downward to create a vacuum in the system. The initial part of the vacuum portion commences, with the liquid reaching the levels as illustrated in FIG. 3. Valve 37 is closed and the vacuum applied to the dosing tube 11 throubh the collecting vessel 22 causes the liquid to fall to the level 57 with the liquid in the transfer vessel 18 completely drained. Liquid is drawn through the dosing vessel 20 into the collecting vessel 22 as shown in FIG. 3. Liquid in reservoir vessel 40 is drawn by the vacuum through bight 39 and opening 38 into the collecting vessel 22. Thus the collecting vessel 22 is filled with liquid from both the dosing tube 11 and the drain tube 15.

A short time later (a few seconds in one embodiment) to allow time for liquid, to recede in the dowing tube 11 to the level of 57, (a shown in FIG. 3) the programmer 50 provides a signal to open valve 37 thereby commencing the main part of the vacuum portion, as particularly illustrated in FIG. 4. Liquid from the supply tube 13 enters the transfer vessel 18 through the conduit 34 and runs down the bight 19 on top of the liquid already present in the dosing tube 11. Thus it may be seen that liquid from the new sample enters the dosing tube 11 on top of the liquid remaining in the tube 11 from a previous sample.

The vacuum created in conduit 23 and applied through the collecting vessel 22 to the inlet 14 of the dosing tube causes the liquid in the dosing tube 11 coming from supply tube 13 to rise in leg 21 and fills collecting vessel 22 rising to a level approximately at 58 in the vertical portion of the conduit 23. Liquid is prevented from rising above the level of 58 by the vacuum regulator unit 25. As the level of liquid rises in the collecting vessel 22, liquid will flow from the collecting vessel 22 into the drain tube 15 entering through opening 38. The drain tube 15 is filled with liquid rising through lower bight 39 and filling reservoir vessel 40. The liquid rises in the drain tube 15 until it commences to drain through orifice 41.

During the main part of the vacuum portion of the cycle the liquid in the collecting vessel 22 (as seen in FIG. 4) is a mixture of the liquid from a previous cycle and liquid entering the device during the present cycle. The old and new liquid in the collecting vessel 22 are both continuously flushed out by way of the drain tube 15 with liquid from the present cycle always entering the dosing tube 11 behind the liquid being discharged through the drain tube 15. In this manner an almost pure sample completely free from any contamination from a previous sample is realized during the vacuum portion of each cycle. Of course, it is to be realized that the degree of pureness depends only on the amount of time allotted for the vacuum portion. Over a considerable length of time the sample will become almost 100% free from contamination from the previous cycle.

The vent portion of the cycle now commences with the level of liquid shown in FIG. 1. The programmer 50 provides signals to close valve 37 and cause piston 48 to move downward past the opening 49 thereby creating a vent in the conduit 23. Removal of the vacuum on the collecting vessel 22 permits the liquid in the vessel 22 to drain through the drain tube inlet 38 and the drain tube 15 and to be dischargd through orifice 41. Since the discharge orifice 41 is lower than the connection of the branch 43 to the vertically extending portion 42 of the drain tube 15, liquid flows through the branch 43 until the liquid level in the inclined portion 44 of the tubing falls to the level of the discharge orifice 41. Liquid is thereby completely drained from collecting vessel 22 and falls allow a level 59 in the drain tube 15 well below the outlet 38 of the collecting vessel 22; and in dosing tube 11 the liquid falls to a level indicated by the dashed line 60 at the elevation of the inlet orifice 14 to the dosing tube 11. An equilibrium level is established in the dosing tube 11 at the level 60. As seen in FIG. 1 any semblance of liquid from a previous cycle would be contained in the drain tube 15 and completely separated from liquid in the dosing tube 11.

A signal from programmer 50 to the piston 48 causes the piston to move upward providing pressure in the conduit 23 connecting the pressure portion of the operation cycle. The pressure pushes the liquid in the dosing tube 11 through dosing vessel 20, lower bight 19, transfer vessel 18, upper bight 17 and discharge orifice 16 to the receiving vessel 12. A portion of the liquid in the drain tube 15 is discharged through orifice 41 by reason of the pressure applied through the collecting vessel 22. However no liquid in the drain tube 15 can pass through the dosing tube 11 since the level at the inlet of the dosing tube 11 is higher than the level of liquid in the drain tube 15 at this time.

At the end of the pressure portion of the cycle, as shown in FIG. 2, some liquid remains in the dosing tube 11 and the device is now ready for a subsequent cycle of operation.

The programmer 50 is timed according to desired parameters well known in the art to provide the proper interval between portions of each cycle. In one example, approximately three minutes is allowed for the vacuum portion, one minute for the vent portion, and one minute for the pressure portion. Of course, as the duration of the vacuum portion ofthe cycle increases the degree of purity of the sample is also increased as compared with mixture with a previous sample.

It will be thus seen that the device of the present invention provides a dosing apparatus and method by which the contamination between samples is reduced to a minimum. This is realized because liquid from the supply tube 13 always enters the dosing tube 11 on top of liquid remaining there from a previous opertion and liquids from pevious samples are completely flushed out of vessel 18, bight 19, vessel, and leg 21. A fresh sample mixes with a previous sample in the collector vessel 22 and is flushed out from there through the drain tube 15.

It is to be realized that the present invention provides a system and apparatus by which even small minute does of fresh liquid sample can be fed to a recipient device for analyzing. This is possible because of the ability of the device to control at a fixed constant level the magnitude of the air pressure and vacuum. This control remains uniform through any nunber of cycles. Moreover the liquid dosed is free of entrapped air or of air bubbles or other impurities which can be created in conventional devices because of the liquids seals created in the dosing tube 11, and the drain tube 15. Since the movement between the vessels 20 and 18 occurs via their lower ends respectively, all air escapes vertically from the other or upper ends. Additionally, the movement between vessels 22 and 40 is adapted to prevent air bubbles from collecting in the system.

The location of the liquid in the lower bight 19 of the dosing tube 11 permits the liquid to settle and release entrapped air. Also movement of the liquid in the bight 39 as during the vacuum or vent portion of a cycle has no effect on the actual dosing during the pressure portion of the cycle.

MODIFIED EMBODIMENTS

Figure 5:
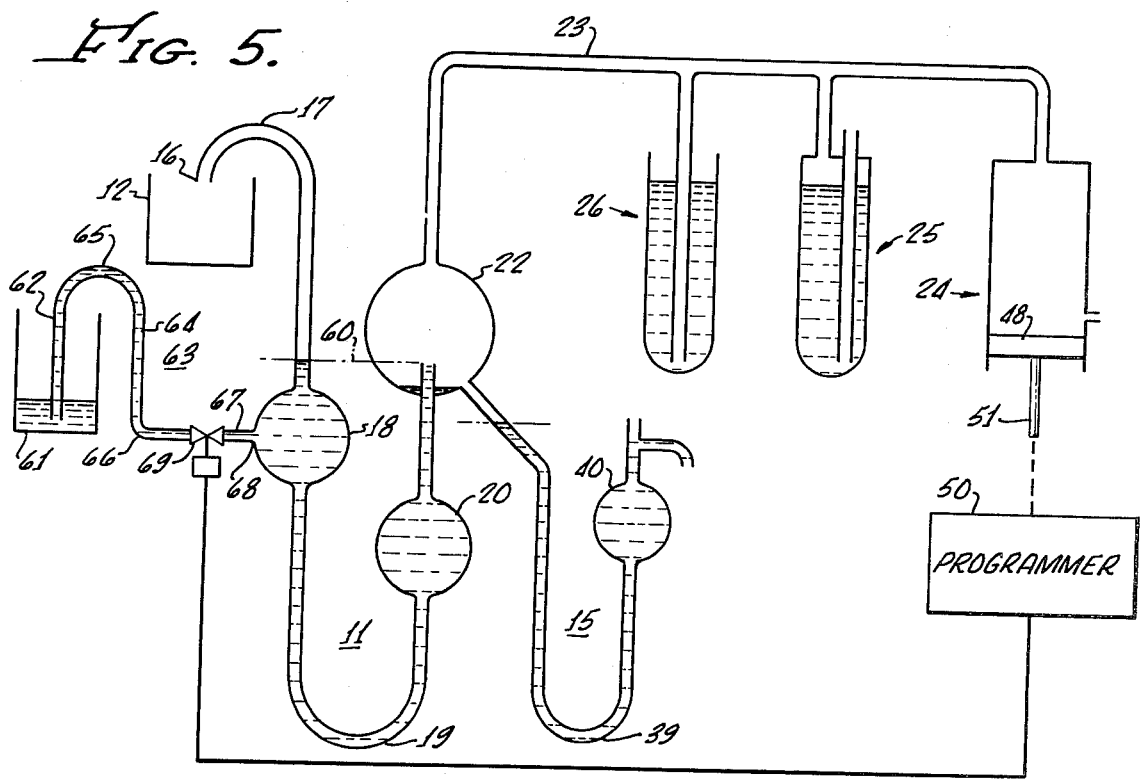
FIG. 5 is a schematic diagram illustrating a modification of the device of FIG. 1 in which a liquid sample for the supply tube is received from a sample vial.

FIG. 5 illustrates a modified version of the supply tube as shown in the device of FIG. 1 in which the liquid sample is obtained from a sample system which contains a vial 61 filled with a liquid. The supply tube, indicated generally at 63 includes a pair of vertical extending legs 62 and 64 joined by an upper bight 65. The leg 62 extends into the vial 61 where it is submerged in liquid. The leg 64 is connected through a lower bight 66 to a feed conduit 67 which has a discharge end 68 connected to an input of the transfer vessel 18. A solenoid operated valve 69 in the conduit 67 operates to selectively pass and block the flow of liquid to the transfer vessel 18 in accordance with control signals from the programmer 50. The liquid level in the container 61 is always maintained above the level of the discharge end 68 in order to provide a siphon operation through the supply tube 63 when the valve 69 is opened.

In operation of the device of FIG. 5 the dosing tube 11, drain tube 15, and other parts correspond to that of FIG. 1. During a cycle of operation commencing with a signal from programmer 50 to cause piston 48 to move downward to create a vacuum in leg 23 and to open valve 69 a short time later the vacuum portion of the cycle commences. Liquid from vial 61 is siphoned through supply tube 63 to enter transfer vessel 18 on top of the liquid remaining from a previous sample. The vent and pressure portions of the cycle operate in the same manner as previously described for the device of FIG. 1. Valve 69 is closed by a signal from programmer 50 at a time before the liquid level in vial 61 reaches the lower end of the leg 62 in order to maintain the supply tube 63 completely full of liquid to be able to function as a siphon in subsequent cycles of operation. The vial 61 may be a single container as illustrated or in another embodiment may be one of a plurality of vials located on a rotating sample table. Means (not shown) controlled by the programmer 50 may be provided to rotate the vials at the end of each cycle and thereby provide an automatic sampling operation.

Figure 6:
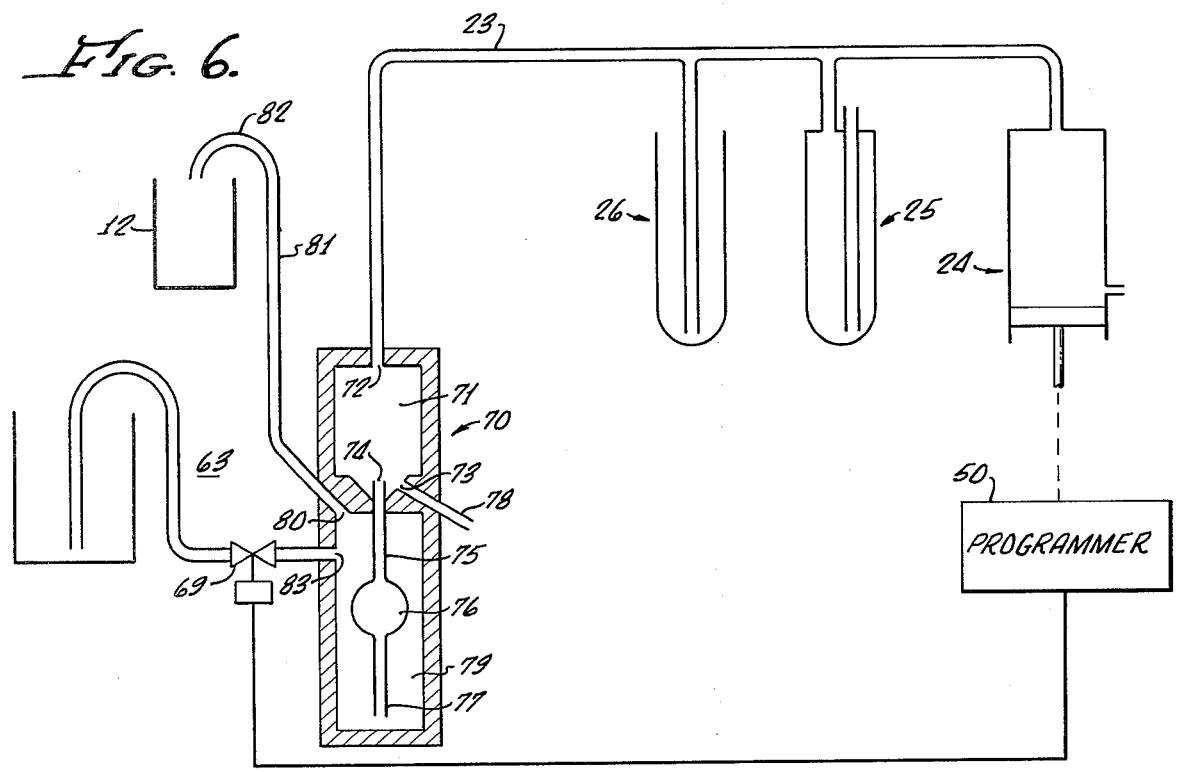
FIG. 6 illustrates another embodiment of the invention in which the dosing tube shown in elevational view is formed of a single unitary and compact structure.

In FIG. 6 there is illustrated another embodiment of the invention in which the aforementioned elements in the dosing tube 11 of the device of FIG. 1 are integrally formed in a single block 70 which preferably is made of material such as polyvinylchloride which is immune to the chemicals in the liquid sample as well as being transparent to allow visual inspection of the operation within the dosing tube. The dosing tube 70 may comprise a generally cylindrically shaped block having recesses and tubes formed therein to comprise the elements of the dosing tube. A recess 71 formed in the upper end of the block functions as the collecting vessel of the dosing tube having an opening 72 connected to the pressure conduit 23 to function in the same manner as the device of FIG. 1. The lower end of the recess 71 has an opening 73 connected to a conduit 78 which forms a part of the drain tube 15 of FIG. 1. An inlet orifice 74 corresponding to the inlet orifice 14 of FIG. 1 extends part way into the lower end of the recess 71 and is connected through a conduit 75 to a bulb 76 which functions as the dosing vessel of the tube. The lower end of the dosing bulb 76 is connected through a conduit 77 to open the bottom part of a recess 79 which comprises the lower part of the block 70. Recess 79 functions as the transfer vessel of the dosing tube having an opening 80 at its upper end connected through a vertical extending conduit 81 to an upper bight 82 which discharges into the recipient container 12 of FIG. 1. The recess 79 has an opening 83 on its left side somewhat below the opening 80 connected to receive a liquid sample from the supply tube 63 as illustrated in the device of FIG. 2.

The device of FIG. 6 operates in the same manner as that described for the device of FIG. 5 with liquid entering opening 83 into recess 79 when valve 69 is opened. It is to be noted that the liquid remaining in recess 79 from a previous cycle is at a level below the opening 83 thereby ensuring that liquid from the previous cycle will be drawn through the dosing vessel 76 and into the collecting vessel 71 ahead of the liquid sample entering the opening 83. Therefore mixing between liquid samples of previous cycles is prevented during the pressure portion of the cycle.

The device of FIG. 6 may be modified to operate in the same manner as the device of FIG. 1 by connecting the valve 69 of the device of FIG. 6 to the supply tube 13 of the device of FIG. 1 as previously described in the operation of the devices.

The compact and unitary structure of the dosing tube 70 of the device of FIG. 6 offers the advantages of simplicity and lower cost as well as greater reliability.

Figure 7:
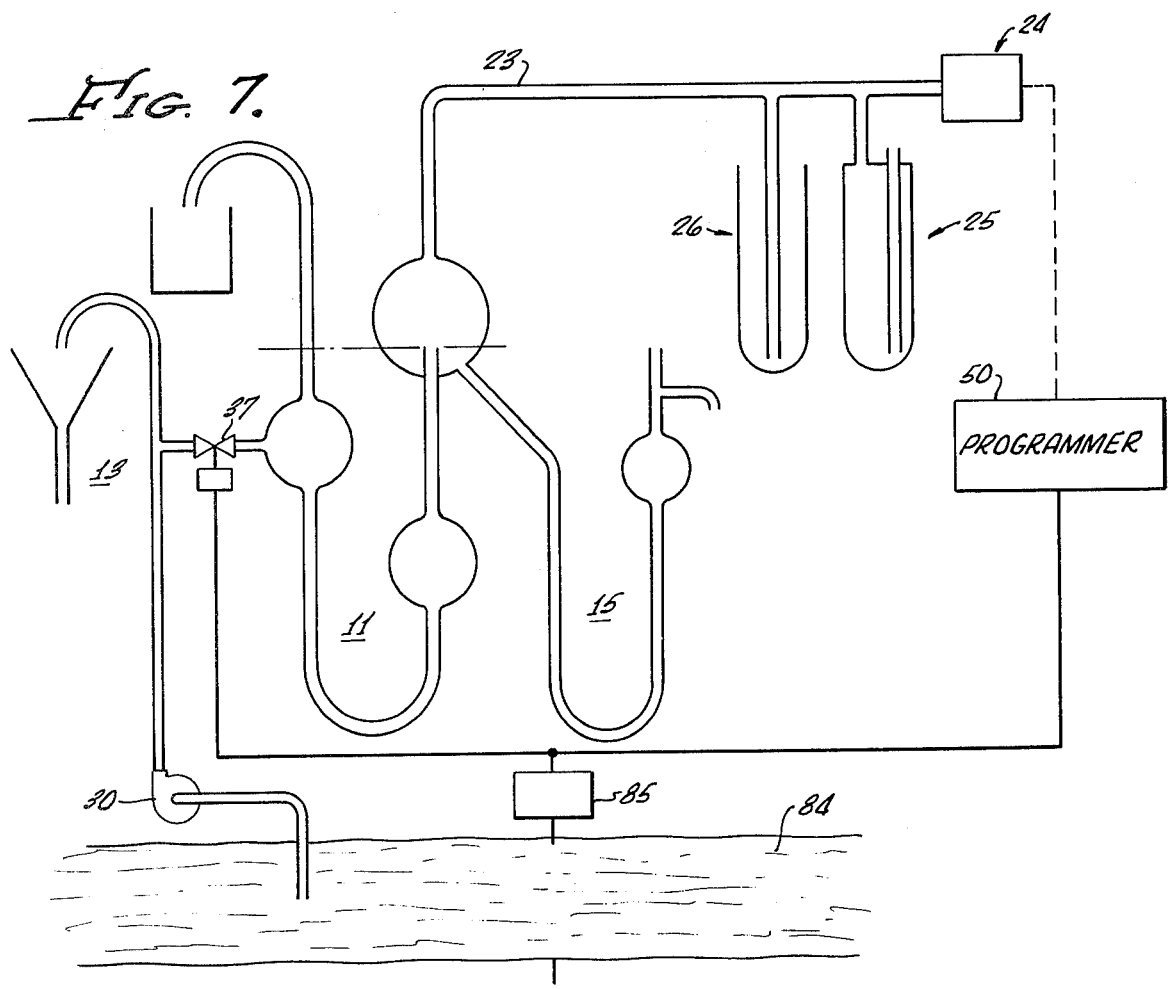
FIG. 7 illustrates another embodiment of the invention in which the supply tube is supplied with a discrete liquid sample according to a predetermined unit of flow in a process stream.

Referring now to FIG. 7, another embodiment of the invention is illustrated in which the device of FIG. 1 is modified so that the device can be operated as a sampling device to take a discrete sample in proportion to the total flow in a process stream. In FIG. 7 a liquid sample is received by the pump 30 from a stream 84. A totalizer 85 measures the total volume of water flowing in the stream 84 and provides a signal indicating a preselected volume to the programmer 50. The device of FIG. 7 operates to commence a dosing cycle upon a signal from programmer 50 to the valve 37 according to a predetermined volume of water flowing in the stream 84 as measured by the totalizer 85. In this manner a composite sample may be taken whose volume is proportional to the volume of flow in the stream 84. Similarly the sampling device of FIG. 7 could be operated at predetermined intervals by having the programmer 50 set to commence cycles of operation at predetermined time intervals.

In FIG. 8 there is shown another embodiment of the invention in which a plurality of dosing devices as shown in FIG. 1 may be arranged to take an aliquot of a previous sample or to perform serial dilutions. The sampling devices 89 and 91 in FIG. 8 may be the same as the device of FIG. 1 of this invention while the sampling devices 90 and 92 are of the reagent type such as shown in U.S. Pat. No. 3,718,438 to Anscherlik previously referred to in this specification. In FIG. 8, the vial 88 may be connected to receive the sample outputs from sampling devices 89 and 90. The samples are mixed in vial 88 and serve as the input into a sampling device 91. The sample output from the sampling device 91 is then combined with the sample output from sampling device 92 in the vial 93. Thus a predetermined proportion of liquid may be utilized. By way of example, the sampling device 89 could be programmed to deliver a sample volume of 2 cc with the sampling device 90 delivering a volume of 50 cc. The resultant mixture in unit 88 then is fed to sampling device 91, which is a 2 cc sampling device whose output is mixed with the output of sampling device 92 which may have a volume output of 50 cc.

It will be appreciated that the apparatus illustrated in the embodiments is capable of automatic operation with other portions of a complete and automatic analytical system. The device is especially adapted to be utilized in remote locations where extreme reliability is desired.

The number of liquid sampling devices constituting a device of the invention may be varied to meet specific requirements. The method of the invention will normally be carried out in apparatus which includes well known elements such as aspherical vessels and connecting conduits made of suitable material which is resistant to all chemicals to be sampled. The programmer may be part of an automatic analyzing system which is coordinated with other programs and functions in the system.

It is characteristic of the design of the device of this invention that it can be used with other parts of analyzing equipment to provide any number of sampling operations at any number of variety without substantially modifying the structure. It can be seen that the device as illustrated in FIG. 1 for example, can serve as a building block to provide many and variable modifications as desired.

The vessels, feed conduits, bights and other elements of the system may be designed to fit a specific requirement. The dimensional relationships between the elements may be altered as desired.

Numerous other modifications and changes will be apparent to those skilled in this art. It is intended therefore that the present disclosure be taken as illustrative only of the invention and not limiting of it in any manner.

It is claimed:

1. A device for dispensing a predetermined quantity of a liquid sample to a recipient system comprising:
   a dosing tube including an inlet orifice, a discharge orifice, a dosing vessel, and a transfer vessel operatively connected between the inlet orifice and the discharge orifice;
   a collecting vessel operatively connected to the inlet orifice at a level below the level of the discharge orifice and above the top of the transfer vessel,
   a source of liquid;
   supply means operatively connected to said liquid source for passing a predetermined amount of liquid from said source to the transfer vessel;
   drain means communicating with the lower portion of said collecting vessel for emptying said collecting vessel;
   and means for selectively providing air under vacuum, atmosphere, and pressure to said collecting vessel during each cycle of operation.

2. A dispensing device as set forth in claim 1 wherein said supply means includes a supply tube having an inlet operatively connected to receive liquid from said source in a continuous flow, an outlet operatively connected to discharge liquid in a continuous flow at a level above the level of the transfer vessel, and feed conduit means communicating with the supply tube and the transfer vessel for selectively passing liquid from the supply tube to the transfer vessel.

3. A dispensing device as set forth in claim 2 wherein there is included a pump connected to the supply tube inlet and responsive to said source of liquid to provide a continuous flow of liquid to the supply tube.

4. A dispensing device as set forth in claim 3 wherein said feed conduit means includes a conduit having an inlet communicating with the supply tube and an outlet communicating with the transfer vessel, and a valve below the inlet and outlet operatively connected to alternately block and pass liquid from the supply tube to the transfer vessel.

5. A dispensing device as set forth in claim 4 wherein is included programming means operatively connected to open and close said valve according to predetermined time intervals whereby liquid flows from said supply tube to said transfer vessel according to signals from said programming means.

6. A dispensing device as set forth in claim 5 wherein said programming means is operatively connected to said means for providing air to cause air under vacuum to be provided to said collecting vessel when said valve is opened to pass liquid from the supply tube to the transfer vessel.

7. A dispensing device as set forth in claim 6 wherein said programming means is operatively connected to said means for providing air to cause air under vacuum to be provided to said collecting vessel shortly before said valve is opened to pass liquid from the supply tube to the transfer vessel whereby liquid remaining in said dosing tube is withdrawn from the transfer vessel ahead of liquid being passed from the supply tube to the transfer vessel.

8. A dispensing device as set forth in claim 7 wherein said programming means is operatively connected to said means for providing air to cause air under vent to be provided to said collecting vessel when said valve is closed.

9. A dispensing device as set forth in claim 8 wherein said programming means is operatively connected to said means for providing air under pressure to be provided to said collecting vessel after air under vent is provided to said collecting vessel whereby liquid is said dosing tube is dispensed through the discharge orifice to said recipient system.

10. A dispensing device as set forth in claim 1 wherein said drain means includes a drain tube having an inlet connected to the lower portion of said collecting vessel, a lower bight, a downwardly extending leg connecting the inlet and the lower bight, a discharge orifice, an upwardly extending leg connecting the lower bight and the discharge orifice, and a reservoir vessel operatively connected in said upwardly extending leg between the lower bight and said discharge orifice, the level of the discharge orifice being below the level of the inlet.

11. A dispensing device as set forth in claim 10 wherein the liquid in the reservoir vessel of said drain tube is operatively connected to supply liquid to said collecting vessel during the vacuum portion of a cycle of operation.

12. A dispensing device as set forth in claim 1 wherein said supply means includes a supply tube having first and second vertically extending legs, an upper bight operatively connected between the legs, a container for liquid to be sampled having the first leg submerged therein, and feed conduit means operatively connected between the second leg and the transfer vessel, the level of liquid in the container being above the level of said feed conduit means whereby liquid is siphoned from said container to said transfer vessel.

13. A dispensing device as set forth in claim 1 wherein said supply means is connected to the transfer vessel to pass liquid from said source to the transfer vessel on top of liquid remaining in said dosing tube from a previous cycle of operation.

14. A dispensing device as set forth in claim 1 wherein said supply means includes a supply tube having in inlet operatively connected to receive liquid from a source in a continuous flow, a container, an outlet opening connected to discharge liquid to said container, feed conduit means communicating with the supply tube and the transfer vessel for selectively passing liquid from the supply tube to the transfer vessel, and a valve operatively connected in said supply tube and responsive to a signal to close the flow of liquid in said supply tube at a predetermined volume of flow.

15. A dispensing device as set forth in claim 1 wherein said drain means is operatively connected to said collecting vessel to provide flow of liquid from said collecting vessel through said drain means during the pressure portion of a cycle of operation.

16. A dispensing device as set forth in claim 1 wherein the lower portion of said collecting vessel is below said inlet orifice.

17. A dispensing device as set forth in claim 1 wherein said means for selectively providing air comprises a pump operatively connected to provide air under pressure, vacuum, or atmosphere.

18. A dispensing device as set forth in claim 16 wherein there is included means for regulating the amount of pressure and vacuum produced by said means for selectively providing air.

19. A method of dispensing a predetermined quantity of a liquid sample to a recipient system having a dosing tube, a supply tube, and a drain tube, including the steps of:

supplying air under vacuum, atmosphere and pressure to said dosing tube during corresponding vacuum, vent, and pressure portions of an operation cycle;

passing a liquid sample from a source through said supply tube to said dosing tube during the vacuum portion of a cycle of operation;

blocking the flow of said liquid sample from supply tube to said dosing tube during the vent and pressure portions of a cycle of operation;

removing liquid from said dosing tube in excess of a predetermined quantity through said drain tube during the vent portion of a cycle of operation; and discharging liquid in said dosing tube to said recipient system during the pressure portion of a cycle of operation.

20. A method according to claim 19 in which liquid is passed to said dosing tube shortly after the beginning of the vacuum portion of a cycle of operation whereby liquid remaining in the dosing tube from a previous cycle of operation is removed through said drain tube ahead of the liquid entering said dosing tube during the following cycle of operation.

21. A method according to claim 19 wherein said liquid sample is passed from said supply tube to said dosing tube according to predetermined quantities based upon a total amount of liquid flowing in a stream.

22. A method according to claim 19 wherein said liquid sample is passed from said supply tube to said dosing tube according to predetermined quantities based upon the amount of liquid flowing in a stream for a given period of time.

23. A method according to claim 19 wherein the method of claim 19 is repeated with a plurality of recipient systems in serial fashion.

* * * * *